United States Patent [19]

Yoshida et al.

[11] Patent Number: 5,354,834
[45] Date of Patent: Oct. 11, 1994

[54] POLYISOCYANATE CURING AGENT, AND COATING COMPOSITION AND ADHESIVE COMPOSITION EMPLOYING THE SAME

[75] Inventors: Mitsuhiro Yoshida, Hiratsuka; Susumu Sato; Yukio Obuchi, both of Yokohama; Shin Konishi; Masanori Shindo, both of Fujisawa, all of Japan

[73] Assignee: Nippon Polyurethane Industry Co., Ltd., Tokyo, Japan

[21] Appl. No.: 819,259

[22] Filed: Jan. 10, 1992

[30] Foreign Application Priority Data

Jan. 14, 1991 [JP] Japan ..................... 3-69553

[51] Int. Cl.$^5$ ............... C08G 18/00; C08G 18/10; C08G 18/32; C08G 18/38
[52] U.S. Cl. ..................... 528/59; 524/590; 528/44; 528/85
[58] Field of Search ............... 528/44, 85, 59; 524/590

[56] References Cited

U.S. PATENT DOCUMENTS

| | | |
|---|---|---|
| 4,187,215 | 2/1980 | Wrightson .................... 528/52 |
| 4,576,855 | 3/1986 | Okina et al. ................. 428/423.3 |
| 4,929,724 | 5/1990 | Engbert et al. ............... 540/202 |
| 5,043,092 | 8/1991 | Pedain et al. ................ 252/182.21 |

FOREIGN PATENT DOCUMENTS

| | | |
|---|---|---|
| 63-265970 | of 1988 | Japan . |
| 2-620 | of 1990 | Japan . |
| 1402658 | 8/1975 | United Kingdom ........ C08G 18/28 |
| 1402659 | 8/1975 | United Kingdom ........ C08G 18/28 |
| 2203159 | 10/1988 | United Kingdom ........ C08G 18/18 |

*Primary Examiner*—Paul R. Michl
*Assistant Examiner*—P. Niland
*Attorney, Agent, or Firm*—Davis Hoxie Faithfull & Hapgood

[57] ABSTRACT

A curing agent for a two-component type polyurethane, containing as a main constituent a polyisocyanate derived from hexamethylene diisocyanate, the polyisocyanate having a viscosity of lower than 1,400 mP.a/25° C. in substantially free from monomeric hexamethylene diisocyanate and a solvent, having a uretidine dione dimer content of more than 10%, and having an isocyanurate cyclic trimer content of less than 60%.

21 Claims, No Drawings

POLYISOCYANATE CURING AGENT, AND COATING COMPOSITION AND ADHESIVE COMPOSITION EMPLOYING THE SAME

BACKGROUND OF THE INVENTION

1. Field of the Invention

The present invention relates to a curing agent mainly composed of a hexamethylene diisocyanate type polyisocyanate compound which contains a uretidine dione dimer and an isocyanurate cyclic trimer. The present invention also relates to a coating composition and an adhesive composition employing the above curing agent.

2. Related Background Art

Coating materials and adhesives have come to be strongly desired to meet the requirements on material saving, low environmental pollution, and safety. Consequently, coating materials and adhesives of high solid type, powder type, and aqueous type, and adhesives of hot-melt type are come to be high-lighted. Particularly in the United States, high-solid types of coating materials and adhesives are being used to meet the regulation of VOC (volatile organic compounds). In Japan, although the conversion to the high-solid type is delayed in comparison with the conversion in the United States at the moment, the use of the high-solid type of coating materials and adhesives is being investigated because of the movement in environment protection in local governments, and present status of improvement of the conventional coating materials with conversion to high-solid type, and further the trend of unification of quality guarantee system of U.S.-made cars and Japanese-made cars in automobile industries, and so forth.

On the other hand, in practical coating operation, the coating materials needs to be diluted with a suitable solvent to a viscosity required for an coating method to be applied. When a high-viscosity varnish is used in the coating, a larger amount of the solvent has to be used for thinning, which decreases the coating thickness obtained by one coating operation and necessitates repetition of the coating operation to attain a desired coating film thickness, because a minimum coating film thickness and a minimum hiding property are required to achieve the purpose of protection and coloring of articles with a coating material. In the coating process, excessively rapid evaporation or poor evaporation of the solvent causes pinhole formation in the coating film and sagging of the coating material, tending to give poor appearance of the coating film.

One-component types and two-component types of polyurethane coating materials and adhesives, which employ polyisocyanate of the type of hexamethylene diisocyanate (hereinafter referred to as "HDI") as a curing agent, and an acrylic polyol or polyesterpolyol as the polyhydroxyl compound, are superior in weatherability, chemical resistance, abrasion resistance, etc., and are used in application field of exterior coating and adhesion-bonding in automobiles and buildings. In such polyurethane application field also, the highsolid type system, namely a low viscosity type system, is demanded to decrease the amount of the solvent for dilution to get practical coating viscosity, from the standpoint as mentioned above.

As an HDI type of polyisocyanate curing agent, a polyisocyanurate type one is described to be superior in weatherability in "Polyurethane Resin Handbook", pp. 404–406, (published by Nikkan Kogyo Shimbun Ltd.).

However, commercially available curing agents of this type have high viscosity in the state substantially free from HDI monomer and solvent. For example, isocyanurated HDI (Coronate HX, isocyanate content: 21.3%, solid content: 100%, made by Nippon Polyurethane Industry Co.) has a viscosity of 2,400 millipascal.-second/measured at 25° C. ("mP.a/25° C.") in the state in which neither an HDI monomer nor a solvent is contained substantially. Even the lowest-viscosity type of isocyanurated HDI (Duranate TPA-100 (isocyanate content: 23.1%, solid content: 100%, made by Asahi Chemical Industry Co., Ltd.) has a viscosity of 1,400 mP.a/25° C.

On the occasion of the study of the main agent and curing agent in order to achieve a high-solid formulation of two-component type polyurethane, the polyhydroxyl compound may be selected from high-solid types, namely low-viscosity or low-molecular weight types, of polyesterpolyol, alkyd polyol, epoxypolyol, acryl polyol and the like. However, in order to obtain a high-solid formulation as a total system, the curing agent also needs to be selected from those having both a lower molecular weight and a lower viscosity than conventional ones. At this time, the curing agent needs to have an isocyanurate ring in the molecule in view of weatherability as mentioned above. However, the low molecular weight type of curing agent itself has a lower limit in molecular weight since it is derived from 3 moles of HDI, so that the viscosity thereof cannot be lower than about 1,400 mP.a/25° C. mentioned above.

For the purpose of solving the above-mentioned problems in conventional polyurethane coating materials and adhesives, the inventors noticed the uretidine dione structure which is of lower molecular weight than the isocyanurate structure, and tried to introduce the uretidine dione structure into the molecule in a large quantity to give a lower molecular weight and a lower viscosity of the curing agent. As the result, the inventors have found a novel HDI type curing agent, and accomplished the present invention.

SUMMARY OF THE INVENTION

The present invention provides a novel HDI type curing agent which has a low viscosity and a high solid content.

Particularly, the present invention provides a curing agent for a two-component type polyurethane, containing as a main constituent a polyisocyanate derived from hexamethylene diisocyanate, the polyisocyanate having a viscosity of lower than 1,400 mP.a/25° C. in the state substantially free from monomeric hexamethylene diisocyanate and of a solvent, having a uretidine dione dimer content of more than 10%, and having an isocyanurate cyclic trimer content of less than 60%.

The present invention also provides a polyurethane coating composition, containing the above-mentioned polyisocyanate and a polyhydroxyl compound, the molar ratio of isocyanate group in the polyisocyanate to hydroxyl group in the polyhydroxyl compound being in the range of from 9:1 to 1:9.

The present invention further provides a polyurethane adhesive composition, containing the above-mentioned polyisocyanate and a polyhydroxyl compound, the molar ratio of isocyanate group in the polyisocyanate to hydroxyl group in the polyhydroxyl compound being in the range of from 9:1 to 1:9.

DESCRIPTION OF THE PREFERRED EMBODIMENT

The uretidine dione dimer content and the isocyanurate cyclic trimer content are determined from the percentages of the peak areas of gel permeation chromatography (hereinafter referred to as "GPC") using a differential refractometer as the detector.

The uretidine dione dimer has a lower molecular weight and a lower viscosity than those in the isocyanurate cyclic trimer. Thus, the uretidine dione dimer content of not more than 10% will not give the low viscosity being the object of the present invention.

If a low viscosity of the polyisocyanate in which the uretidine dimer content is not more than 10% is attained by making an isocyanurate cyclic trimer content of 60% or higher and, the resulting polyisocyanate has a high function number, because the isocyanurate cyclic trimer is trifunctional while the uretidine dione dimer is difunctional. Consequently, the coating film prepared becomes rigid and brittle, resulting in poor adhesion and peeling. This poorness is clearly seen in coating film properties such as impact resistance, flex property, and Erichsen test in the Examples and Comparative examples shown below.

In order to improve the brittleness only by raising the isocyanurate cyclic trimer content, it is necessary that the curing agent has higher molecular weight. However, the isocyanurate cyclic trimer has inherently a more rigid structure than the uretidine dione dimer, giving necessarily a coating film of a rigid structure. Furthermore, because of the high molecular weight of the curing agent, the high solid content and the high build coating which is characteristics of the present invention cannot be attained.

The polyisocyanate of the present invention, contains a uretidine dione dimer having lower function number than that of an isocyanurate cyclic trimer in an amount of not less than 10%, preferably from 15 to 40%. Thus, the present polyisocyanate has a low viscosity of not higher than 1,400 mP.a/25° C., preferably from 100 to 1,000 mP.a/25° C. in the state substantially free from HDI monomer and solvent. Further, the film obtained is characteristically flexible.

In recent years, the trend of use of plastics is remarkable especially for automobile parts. Plastics have generally a higher thermal expansion coefficient than that of metals. Therefore, if the coating film is rigid, the film cannot adapt to the thermal change of the base material, being liable to give poor adhesion. On the contrary, the composition of the present invention forms flexible coating film, giving sufficient adhesion strength, and being suitable for coating materials and adhesives for plastics.

The attempt to lower the viscosity with the uretidine dione dimer content of less than 10% and the isocyanurate cyclic trimer content of 60% or higher, as described in e.g. Japanese Patent Application Laid-Open Nos. Sho-63-265970 and Hei-2-620, results in the above-described practical disadvantages.

On the other hand, the uretidine linkage may be presumed to involve a problem in storage stability judged from the known fact that the urethodione will dissociate on heating to regenerate an isocyanate. Experimentally, however, the thermal dissociation temperature is about 150° C., and no change was observed in the isocyanate content, the viscosity, the IR absorption spectrum, and GPC peak pattern in storage for 7 months at room temperature, or for 3 months at 50° C. Therefore, the descriptions regarding the storage stability in the Japanese Patent Application Laid-Open Nos. Sho-63-265970, Hei-2-620, etc. are not appropriate.

The polyisocyanate of the present invention contains isocyanurate cyclic trimer in an amount of less than 60%, preferably from 15% to 45% by GPC analysis. The present polyisocyanate contains the isocyanate group and the uretidine group in a ratio of from 0.2:1 to 0.7:1 as a whole contains by measuring from the ratio of the peak absorbance at 1690 $cm^{-1}$ of the isocyanurate group to the peak absorbance at 1770 $cm^{-1}$ of the urethodione group. It is shown in the Examples below based on the measurement that the weatherability can be kept by the above-mentioned contents of trimer.

As described above, the polyisocyanate of the present invention has a uretidine structure effective in lowering the viscosity as well as the isocyanurate structure required for retaining weather resistance.

In order to obtain the polyisocyanurate compound of the present invention, it is preferable to prepare it either through a uretidine structure or by the isocyanuration reaction occurring as a side reaction. Furthermore, for obtaining a low-viscosity type of polyisocyanate used in the present invention, the reaction has to be stopped at an early stage of the reaction. Therefore, when the intended reaction ratio has been attained, the reaction is stopped by addition of phosphoric acid, methyl p-toluenesulfonate, or the like, and the unreacted free HDI in the reaction mixture is removed to a remaining content of not more than 0.5% by weight, for example, by extraction with n-hexane, or by thin-film distillation under high vacuum of 0.01 to 0.1 Torr at a temperature of 120° to 140° C.

The catalyst effective to produce simultaneously both the uretidine dione dimer and the isocyanurate cyclic trimer of the present invention includes triethylphosphine, dibutylethylphosphine, tri-n-propylphosphine, triisopropylphosphine, tri-n-butylphosphine, triisobutylphosphine, tri-tert-butylphosphine, triamylphosphine, trioctylphosphine, tribenzylphosphine, benzylmethylphosphine, and the like.

Usually the reaction is conducted in an inert solvent or mixture thereof conventionally used in polyurethane industry including aromatic solvents such as toluene, xylene, and other aromatic solvent such as SWAZOLE ® and SOLVESSO ®: ketone type solvents such as methyl ethyl ketone, methyl isobutyl ketone, and cyclohexanone; ester type solvents such as ethyl acetate, butyl acetate, and isobutyl acetate; glycoletherester type solvents such as ethylene glycol ethyl ether acetate, propylene glycol methyl ether acetate, 3-methyl-3-methoxybutyl acetate, and ethyl 3-ethoxypropionate; and ether type solvents such as tetrahydrofuran, and dioxane, thereby adjusting the viscosity in corresponding the reaction conditions.

The reaction is usually conducted at a temperature within the range of from 50° to 90° C.

The polyhydroxyl compound employed in the coating material or the adhesive composition of the present invention is preferably a compound having two or more hydroxyl groups in the molecule. Specifically, the polyhydroxyl compound includes saturated or unsaturated polyester resins, polycaprolactone resins, saturated or unsaturated oil- or fatty acid-modified alkyd resins, aminoalkyd resins, polycarbonate resins, acrylic resins, polyether resins, epoxy resins, polyurethane resins, cellulose acetate butyrate resins, fluorine-containing resins, and the like. Of these, particularly preferable as the polyhydroxyl compound are saturated or unsaturated polyester resins, saturated or unsaturated oil-modified or fatty acid-modified alkyd resins, and acrylic resins in view of coating film properties such as gloss, fleshiness, hardness, flexibility, and durability; workability such as drying property and curing characteristics; cost, and so forth.

In the coating material or the adhesive composition of the present invention, the molar ratio of the isocyanate group in the polyisocyanate to the hydroxyl group in the polyhydroxyl compound ranges from 9:1 to 1:9, preferably from 6:4 to 4:6.

The composition of the present invention may contain a conventional pigment or pigments, an additive, or the like. The composition of the present invention can be applied by a conventional coating method, employing an air-less spraying machine, an air spraying machine, an electrostatic spraying machine, an immersion coating apparatus, a roll coating machine, a brush, or the like.

The present invention has made it possible to provide a high-solid type and non-solvent type of coating material or adhesive composition which is superior in weatherability, flexibility, and other properties, by the combination of a curing agent containing a low viscosity polyisocyanate as the main component and a polyhydroxyl compound. The composition of the present invention serves for material saving and environmental pollution prevention, and further enables high build coating in one application in comparison with conventional coating materials and adhesives, thus improving the limitation of pinhole and sagging. Accordingly, the composition of the present invention is applied advantageously to a variety of articles to be coated such as metals, plastics, concrete, wood, and the like.

The present invention is described in more detail by reference to Examples and Comparative examples without limiting the invention in any way. Throughout Examples and Comparative examples, the terms "parts" and "%" are all based on weight.

EXAMPLE 1

3,000 parts of HDI (made by Nippon Polyurethane Industry Co., isocyanate content: 49.9%, solid content: 100%) and 6.0 parts of trioctylphosphine as the catalyst were charged in a reactor equipped with a stirrer, a thermometer, and a cooler. The reaction mixture was heated to 50°–60° C. with stirring and the reaction was allowed to proceed stirring at the same temperature for 8 hours. Then 1.9 parts of phosphoric acid was added to stop the reaction to obtain a pale yellow reaction liquid having an isocyanate content of 42.1%.

Unreacted HDI was removed by thin-film distillation at 120° C. under a pressure of 0.01 Torr to obtain 900 parts of a pale yellow reaction product "A-1" which had an isocyanate content of 23.2% (remaining free HDI content: 0.2% as measured by gas chromatography), a uretidine dione dimer content of 32% and an isocyanurate cyclic trimer content of 44% by GPC analysis, and a viscosity of 100 mP.a/25 ° C.

Coating composition 282.0 parts of titanium white was added to 364.2 parts of acryl-polyol (Joncryl made by Johnson Co., hydroxyl value: 112, solid content: 80%), the pigment content in final coating composition being 40% by weight (hereinafter pigment weight being referred to as "PWC"). Subsequently, 222.2 parts of a mixed solvent of toluene/ethyl acetate/butyl acetate/cellosolve acetate (1/1/1/1 by weight) was added thereto so that the viscosity for coating at 20° C. of the final coating composition becomes 25 seconds of Ford cup No. 4. (The above mixed solvent is hereinafter referred to as "D/D solvent".) The pigment was dispersed in the mixture with a predetermined amount of glass beads by means of a shaker to obtain a liquid dispersion.

The glass beads were removed from the liquid dispersion. To 400 parts of the resulting dispersion, 60.6 parts of the composition "A-1" prepared above was added to obtain a coating composition. This coating composition had a coating solid content of 70.5%.

Test of Coating Film

The coating composition prepared as above was applied on a steel panel (JIS G3141 <SPCC-SB>, specification: PF-1077, made by Nippon Test Panel Kogyo K.K., hereinafter referred to as "bonderized steel panel") degreased by trichloroethylene, and the applied matter was left standing at 20° C. and 65% RH for one week to form a coating film of 40–50$\mu$ in dry thickness.

The properties of the resulting coating film were evaluated by the test methods below. The results of the test are shown in Table 1.

Adherence: Cross cut tape test of JIS 5400,
Impact strength: ½ inch, 1 Kg,
Chemical resistance: 20° C., 24 hours,
Water resistance: 20° C., 24 hours,
Stain resistance: JIS K 5400
Weatherability: Shown by gloss retaining ratio (%) and discoloration degree ($\Delta E$) in 2000 hour test according to JIS K 5400 under conditions of black panel temperature of 63±3° C. and spray time of 18 minutes per 120 minutes with a Sunshine Weather-o-meter (made by Suga Shikenki K.K.).

EXAMPLE 2

3,000 parts of HDI (made by Nippon Polyurethane Industry Co., isocyanate content: 49.9%, solid content: 100%) and 6.0 parts of tributylphosphine as the catalyst were charged in a reactor equipped with a stirrer, a thermometer, and a cooler. The reaction mixture was heated to 50°–60° C. with stirring, and the reaction was allowed to proceed with stirring at the same temperature for 23 hours. Then 3.5 parts of phosphoric acid was added to stop the reaction to obtain a pale yellow reaction solution having an isocyanate content of 30.3%.

Unreacted HDI was removed by thin-film distillation at 120° C. under a pressure of 0.01 Torr to obtain 1,800 parts of a pale yellow reaction product "A-2" which had an isocyanate content of 18.7% (remaining free HDI content: 0.3% as measured by gas chromatography), a uretidine dione dimer content of 18% and an isocyanurate cyclic trimer content of 20% by GPC analysis, and a viscosity of 580 mP.a/25° C.

Coating Composition 273.2 parts of titanium white was added to 406.5 parts of acryl-polyol (Hitaloid 3083-70B made by Hitachi Chemical Co., Ltd., hydroxyl value: 70, solid content: 70%), the PWC in final coating composition being 40% by weight. Subsequently, 195.1 parts of the D/D solvent was added thereto so that the viscosity for coating at 20° C. of the final coating composition becomes 25 seconds of Ford cup No. 4. The pigment was dispersed in the mixture with a predetermined amount of glass beads by means of a shaker to obtain a liquid dispersion.

The glass beads were removed from the dispersion. To 400 parts of the resulting dispersion, 57.3 parts of the composition "A-2" prepared above was added to obtain a coating composition. This coating composition had a coating solid content of 68.3%.

Test of Coating Film

The coating composition prepared as above was applied on a bonderized steel panel degreased by trichloroethylene, and the applied matter was left standing at 20° C. and 65% RH for one week to form a coating film of 40–50μ in dry thickness.

The properties of the resulting coating film were evaluated in the same manner as described in Example 1. The results of the test are shown in Table 1.

EXAMPLE 3

2,987.4 parts of HDI (made by Nippon Polyurethane Industry Co., isocyanate content: 49.9%, solid content: 100%) and 12.6 parts of 1,3-butanediol were charged in a reactor equipped with a stirrer, a thermometer, and a cooler. The reaction mixture was heated to 60°–70° C. with stirring, and the reaction was allowed to proceed at the same temperature for 3 hours with stirring to obtain a pale yellow reaction liquid having an isocyanate content of 49.3%. To this reaction liquid, 6.0 parts of triamylphosphine was added, and further the reaction was allowed to proceed with stirring at 50°–60° C. for 25 hours. Then 5.5 parts of methyl p-toluenesulfonate was added to stop the reaction to obtain a pale yellow reaction liquid having an isocyanate content of 30.3%.

Unreacted HDI was removed by thin film distillation at 140° C. under a pressure of 0.01 Torr to obtain 1,650 parts of a pale yellow reaction product "A-3" having an isocyanate content of 18.7% (remaining free HDI content: 0.1% as measured by gas chromatography), a uretidine dione dimer content of 20% and an isocyanurate cyclic trimer content of 20% by GPC analysis, and a viscosity of 750 mP.a/25° C.

Coating Composition 274.8 parts of titanium white was added to 268.8 parts of polyesterpolyol (Nippolan 800-75E made by Nippon Polyurethane Industry Co., hydroxyl value: 217.5, solid content: 75%), the PWC in final coating composition being 40% by weight. Subsequently, 245.8 parts of the D/D solvent was added thereto so that the viscosity for coating at 20° C. of the final coating composition becomes 25 seconds of Ford cup No. 4. The pigment was dispersed in the mixture with a predetermined amount of glass beads by means of a shaker to obtain a liquid dispersion.

The glass beads were removed from the liquid dispersion. To 400 parts of the resulting dispersion, 106.7 parts of the composition "A-3" prepared above was added to obtain a coating composition. This coating composition had a coating solid content of 68.7%.

Test of Coating Film

The coating composition prepared as above was applied on a bonderized steel panel degreased by trichloroethylene, and the applied matter was left standing at 20° C. and 65% RH for one week to form a coating film of 40–50μ in dry thickness.

The properties of the resulting coating film were evaluated in the same manner as described in Example 1. The results of the test are shown in Table 1.

EXAMPLE 4

A composition (varnish) was prepared in the same manner as described in Example 1 without using titanium white. The varnish was tested for adhesiveness as described below.

Polyurethane RIM molded sheets (RIM: reactive injection molding), FRP sheets, ABS sheets, and bonderized steel panel having respectively a thickness of 3 mm were degreased with trichloroethylene. On the sheets, the above composition (varnish) was applied to give a dry thickness of 40–50μ. The applied varnish was preliminarily dried at 50° C. for 5 minutes to evaporate the solvent in the coating film. Then the same kind of the sheets were superposed with care not to incorporate an air bubble therebetween, and kept standing under a contact pressure of 25 kg/cm$^2$ and under the same conditions as described in Example 1.

The samples were cut into pieces having a breadth of 25 mm, and the adhesive strength (for peeling) was measured for respective samples with tensile rate of 100 mm/min by means of Tensilon UTM-500 made by Orientic K.K. according to JIS K6854. The results are shown in Table 3.

COMPARATIVE EXAMPLE 1

3,000 parts of HDI (made by Nippon Polyurethane Industry Co., isocyanate content: 49.9%, solid content: 100%) and 0.3 parts of tetramethylammonium hydroxide as the catalyst were charged in a reactor equipped with a stirrer, a thermometer, and a cooler. The reaction mixture was heated to 50°–60° C. with stirring, and the reaction was allowed to proceed with stirring at the same temperature for 4 hours. At the time when the isocyanate content reached 46.3%, 0.2 parts of phosphoric acid was added to stop the reaction to obtain a pale yellow reaction liquid.

Unreacted HDI was removed by thin film distillation at 150° C. under a pressure of 0.06 Torr to obtain 600 parts of a pale yellow reaction product "B-1" having an isocyanate content of 23.5% (remaining free HDI content: 0.1% as measured by gas chromatography), an isocyanurate cyclic trimer content of 71% and a uretidine dione dimer content of 1% by GPC analysis, and a viscosity of 1,600 mP.a/25° C.

Coating Composition 217.2 parts of titanium white was added to 494.2 parts of acryl-polyol (Acrydic A-801 made by Dainippon Ink and Chemicals, Inc., hydroxyl value: 50, solid content: 50%), the PWC in final coating composition being 40% by weight. Subsequently, 209.9 parts of the D/D solvent was added thereto so that the viscosity for coating at 20° C. of the final coating composition becomes 25 seconds of Ford cup No. 4. The pigment was dispersed in the mixture with a predetermined amount of glass beads by means of a shaker to obtain a liquid dispersion.

The glass beads were removed from the liquid dispersion. To 400 parts of the resulting dispersion, 34.2 parts of the composition "B-1" prepared above was added to obtain a coating composition. This coating composition had a coating solid content of 54.3%.

Test of Coating Film

The coating composition prepared as above was applied on a bonderized steel panel degreased by trichloroethylene, and the applied matter was left standing at 20° C. and 65% RH for one week to form a coating film of 40-50μ in dry thickness.

The properties of the resulting coating film were evaluated in the same manner as described in Example 1. The test results are shown in Table 2.

COMPARATIVE EXAMPLE 2

3,000 parts of HDI (made by Nippon Polyurethane Industry Co., isocyanate content: 49.9%, solid content: 100%) and 0.3 parts of tetramethylammonium hydroxide as the catalyst were charged in a reactor equipped with a stirrer, a thermometer, and a cooler. The reaction mixture was heated to 50°-60° C. with stirring, and the reaction was allowed to proceed with stirring at the same temperature for 8 hours. At the time when the isocyanate content reached 42.3%, 0.2 parts of phosphoric acid was added to stop the reaction to obtain a pale yellow reaction liquid.

Unreacted HDI was removed by thin film distillation at 150° C. under a pressure of 0.1 Torr to obtain 1,020 parts of a pale yellow reaction product "B-2" having an isocyanate content of 20.9% (remaining free HDI content: 0.1% as measured by gas chromatography), an isocyanurate cyclic trimer content of 46% and a uretidine dione dimer content of 0.3% by GPC analysis, and a viscosity of 2,800 mP.a/25° C.

Coating Composition 252.4 parts of titanium white was added to 388.0 parts of acryl-polyol (Hitaloid 3083-70B made by Hitachi Chemicals Co., Ltd., hydroxyl value: 70, solid content: 70%), the PWC in final coating composition being 40% by weight. Subsequently, 252.6 parts of the D/D solvent was added thereto so that the viscosity for coating at 20° C. of the final coating composition becomes 25 seconds of Ford cup No. 4. The pigment was dispersed in the mixture with a predetermined amount of glass beads by means of a shaker to obtain a liquid dispersion.

The glass beads were removed from the liquid dispersion. To 400 parts of the resulting dispersion, 47.9 parts of the composition "B-2" prepared above was added to obtain a coating composition. This coating composition had a coating solid content of 63.1%.

Test of Coating Film

The coating composition prepared as above was applied on a bonderized steel panel degreased by trichloroethylene, and the applied matter was left standing at 20° C. and 65% RH for one week to form a coating film of 40-50μ in dry thickness.

The properties of the resulting coating film were evaluated in the same manner as described in Example 1. The results of the test are shown in Table 2.

COMPARATIVE EXAMPLE 3

2,987.4 parts of HDI (made by Nippon Polyurethane Industry Co., isocyanate content: 49.9%, solid content: 100%) and 12.6 parts of 1,3-butanediol were charged in a reactor equipped with a stirrer, a thermometer, and a cooler. The reaction mixture was heated to 60°-70° C. with stirring, and the reaction was allowed to proceed at the same temperature for 3 hours with stirring to obtain a pale yellow reaction liquid having an isocyanate content of 49.3%. To this reaction liquid, 0.3 part of tetramethylammonium acetate was added, and further the reaction mixture was heated to 50°-60° C. with stirring, and the reaction was allowed to proceed with stirring at the same temperature for 12 hours. At the time when the isocyanate content reached 40.5%, 0.2 parts of phosphoric acid was added to stop the reaction to obtain a pale yellow reaction liquid.

Unreacted HDI was removed by thin film distillation at 130° C. under a pressure of 0.02 Tort to obtain 1,400 parts of a pale yellow reaction product "B-3" having an isocyanate content of 20.2% (remaining free HDI content: 0.2% as measured by gas chromatography), an isocyanurate cyclic trimer content of 40% and a uretidine dione dimer content of 0.2% by GPC analysis, and a viscosity of 4,100 mP.a/25° C.

Coating Composition 253.6 parts of titanium white was added to 257.8 parts of polyesterpolyol (Nippolan 800-75E, hydroxyl value: 217, solid content: 75%), the PWC in final coating composition being 40% by weight. Subsequently, 301.5 parts of the D/D solvent was added thereto so that the viscosity for coating at 20° C. of the final coating composition becomes 25 seconds of Ford cup No. 4. The pigment was dispersed in the mixture with a predetermined amount of glass beads by means of a shaker to obtain a liquid dispersion.

The glass beads were removed from the liquid dispersion. To 400 parts of the resulting dispersion, 92.0 parts of the composition "B-3" prepared above was added to obtain a coating composition. This coating composition had a coating solid content of 63.4%.

Test of Coating Film

The coating composition prepared as above was applied on a bonderized steel panel degreased by trichloroethylene, and the applied matter was left standing at 20° C. and 65% RH for one week to form a coating film of 40-50μ in dry thickness.

The properties of the resulting coating film were evaluated in the same manner as described in Example 1. The results of the test are shown in Table 2.

COMPARATIVE EXAMPLE 4

A composition (varnish) was prepared in the same manner as described in Comparative example 1 without using titanium white. The varnish was tested for adhesiveness under the same conditions as described in Example 4. The results are shown in Table 3.

TABLE 1

Properties of Coating Film of Examples

| | Example | | |
|---|---|---|---|
| | 1 | 2 | 3 |
| Coating solid content (%) by weight) | 70.5 | 68.3 | 68.7 |
| Appearance | Good | Good | Good |
| Gloss | 91 | 90 | 86 |
| Pencil hardness | H | H | HB |
| Adherence | 10 | 10 | 10 |
| Flex property | Good | Good | Good |
| Erichsen test | 9.6 | 9.7 | 9.7 |
| Impact strength: | | | |
| front side | 40 | 50 | 95 |
| back side | 30 | 40 | 100 |
| Chemical resistance: | | | |
| 10% HCl | Good | Good | Good |
| 10% NaOH | Good | Good | Good |
| Water resistance | Good | Good | Good |

TABLE 1-continued

Properties of Coating Film of Examples

|  | Example 1 | Example 2 | Example 3 |
|---|---|---|---|
| Stain resistance: | | | |
| Marking ink, black | Good | Good | Good |
| Marking ink, red | Good | Good | Good |
| Shoe polish, black | Good | Good | Good |
| Shoe polish, red | Good | Good | Good |
| Lipstick, red | Good | Good | Good |
| Weatherability: | | | |
| Gloss retention rate (%) | 83 | 86 | 78 |
| ΔE | 1.0 | 0.9 | 1.8 |

TABLE 2

Properties of Coating Film

|  | Comparative example 1 | Comparative example 2 | Comparative example 3 |
|---|---|---|---|
| Coating solid content (% by weight) | 54.3 | 63.1 | 63.4 |
| Appearance | Good | Good | Poor |
| Gloss | 91 | 91 | Poor (52) |
| Pencil hardness | H | H | H |
| Adherence | 0 | 4 | 6 |
| Flex property | Fail. | Fail. | Good |
| Erichsen test | 6.8 | 6.4 | 9.2 |
| Impact strength: | | | |
| front side | Fail.(5) | Fail.(15) | 80 |
| back side | Fail.(0) | Fail.(10) | 70 |
| Chemical resistance: | | | |
| 10% HCl | Good | Good | Good |
| 10% NaOH | Good | Good | Good |
| Water resistance | Good | Good | Good |
| Stain resistance: | | | |
| Marking ink, black | Good | Good | Fail. |
| Marking ink, red | Good | Good | Good |
| Shoe polish, black | Good | Good | Fail. |
| Shoe polish, red | Good | Good | Good |
| Lipstick, red | Good | Good | Good |
| Weatherability: | | | |
| Gloss retention rate (%) | 85 | 84 | 66 |
| ΔE | 0.9 | 1.0 | 2.3 |

TABLE 3

Adhesive Strength (Unit:kg/25 mm)

|  | Example 4 | Comparative example 4 |
|---|---|---|
| RIM | 32/A | 19/B |
| FRP | 46/A | 26/B |
| ABS | 33/A | 17/B |
| Bonderized steel panel | 41/B | 18/B |

A: Substrate failure
B: Cohesive failure

We claim:

1. A method for making a curing agent for a two-component polyurethane comprising the steps of:
   (i) partially urethanizing hexamethylene diisocyanate;
   (ii) Polymerizing said partially urethanized hexamethylene diisocyanate by exposing it to a sufficient amount of catalyst under conditions suitable to produce polyisocyanate having a viscosity lower than 1400 millipascal.second/measured at 25° C. in the state substantially free from monomeric hexamethylene diisocyanate and solvent, and having a uretidine dione dimer content of more than 10 percent by weight and an isocyanurate cyclic trimer content of less than 60 percent by weight of the polyisocyanate.

2. A method for making a polyurethane coating composition comprising the steps of:
   (i) partially urethanizing hexamethylene diisocyanate;
   (ii) Polymerizing said partially urethanized hexamethylene diisocyanate by exposing it to a sufficient amount of catalyst under conditions suitable to produce polyisocyanate having a viscosity lower than 1400 millipascal.second/measured at 25° C. in the state substantially free from monomeric hexamethylene diisocyanate and solvent, and having a uretidine dione dimer content of more than 10 percent by weight and an isocyanurate cyclic trimer content of less than 60 percent by weight of the polyisocyanate; and
   (iii) adding said polyisocyanate to a polyhydroxyl compound.

3. The method of claim 1 and further wherein the polyisocyanate has a uretidine dione dimer content of from about 15 percent by weight to about 40 percent by weight of the polyisocyanate.

4. The method of claim 2 and further wherein the polyisocyanate has a uretidine dione dimer content of from about 15 percent by weight to about 40 percent by weight of the polyisocyanate.

5. The method of claim 1, and further wherein the polyisocyanate has a viscosity of from about 100 to about 1,000 millipascal.second/measured at 25° C. in the state substantially free from monomeric hexameric hexamethylene diisocyanate and solvent.

6. The method of claim 2, and further wherein the polyisocyanate has a viscosity of from about 100 to about 1,000 millipascal.second/measured at 25° C. in the state substantially free from monomeric hexameric hexamethylene diisocyanate and solvent.

7. The method of claim 1, and further wherein the polyisocyanate has an isocyanurate cyclic trimer content of from about 15 percent by weight and 45 percent by weight of the polyisocyanate.

8. The method of claim 2, and further wherein the polyisocyanate has a isocyanurate cyclic trimer content of from about 15 percent by weight and 45 percent by weight of the polyisocyanate.

9. The method of claim 1, and further wherein the polyisocyanate contains isocyanate groups and uretidine groups in a ratio of from about 0.2:1 to about 0.7:1.

10. The method of claim 2, and further wherein the polyisocyanate contains isocyanate groups and uretidine groups in a ratio of from about 0.2:1 to about 0.7:1.

11. The method of claim 1, and further wherein the catalyst is selected from the group consisting of triethylphosphine, dibutylethylphosphine, tri-n-propylphosphine, triisopropylphosphine, tri-n-butylphosphine, triisobutylphosphine, tri-tert-butylphosphine, triamylphosphine, trioctylphosphine, tribenzylphosphine, and benzylmethylphosphine.

12. The method of claim 11, and further wherein the polyisocyanate-producing reaction is stopped by adding phosphoric acid or methyl p-toluenesulfonate to the reaction mixture, and in which sufficient, unreacted monomeric hexamethylene diisocyanate is removed from the reaction mixture so the polyisocyanate contains not more than about 0.5% by weight monomeric hexamethylene diisocyanate.

13. The method of claim 2, and further wherein catalyst is selected from the group consisting of triethylphosphine, dibutylethylphosphine, tri-n-propylphosphine, triisopropylphosphine, tri-n-butylphosphine, triisobutylphosphine, tri-tert-butylphosphine, triamylphosphine, trioctylphosphine, tribenzylphosphine, and benzylmethylphosphine.

14. The method of claim 13, and further wherein the polyisocyanate-producing reaction is stopped by adding phosphoric acid or methyl p-toluenesulfonate to the reaction mixture, and in which sufficient, unreacted monomeric hexamethylene diisocyanate is removed from the reaction mixture so that the polyisocyanate contains not more than about 0.5% by weight monomeric hexamethylene diisocyanate.

15. The method of claim 2, and further wherein the polyhydroxyl compound contains saturated or unsaturated polyester resins, polycaprolactone resins, saturated or unsaturated oil-modified or fatty acid-modified alkyd resins, aminoalkyd resins, polycarbonate resins, acrylic resins, polyether resins, epoxy resins, polyurethane resins, cellulose acetate butyrate resins, or fluorine-containing resins.

16. The method of claim 2, and further wherein the molar ratio of isocyanate groups in the polyisocyanate to hydroxyl groups in the polyhydroxyl compound ranges from about 6:4 to about 4:6.

17. The method of claim 2, and further wherein the polyhydroxyl compound is a polyester polyol.

18. The method of claim 1, and further wherein the partially urethanized hexamethylene diisocyanate is prepared by the reaction of hexamethylene diisocyanate and 1,3-butanediol.

19. The method of claim 2, and further wherein the partially urethanized hexamethylene diisocyanate is prepared by the reaction of hexamethylene diisocyanate and 1,3-butanediol.

20. The method of claim 1 and further wherein the polymerization reaction is conducted at a temperature within the range of from 50° to 90° C.

21. The method of claim 2 and further wherein the polymerization reaction is conducted at a temperature within the range of from 50° to 90° C.

* * * * *